United States Patent
DeBalko et al.

[11] Patent Number: 5,207,583
[45] Date of Patent: May 4, 1993

[54] NETWORK INTERFACE UNIT

[75] Inventors: George A. DeBalko, Washington Township, Morris County, N.J.; Thomas A. Dellinger, North Richland Hills, Tex.; Philip Hughes, Randolph, N.J.

[73] Assignees: Siecor Corporation, Hickory, N.C.; AT&T Bell Laboratories, Murray Hill, N.J.

[21] Appl. No.: 843,136

[22] Filed: Feb. 28, 1992

[51] Int. Cl.⁵ .............................. H04M 9/00
[52] U.S. Cl. .............................. 439/49; 379/399
[58] Field of Search ............... 439/49, 709, 718, 719; 379/399, 325–332; 361/415, 428

[56] References Cited
U.S. PATENT DOCUMENTS 3,829,741 8/1974 Athey ........................ 361/415
4,362,905 12/1982 Ismail ........................ 439/653
4,529,847 7/1985 DeBalko .................... 179/175.3 F
4,651,340 3/1987 Marson ...................... 379/327
4,758,921 7/1988 Hung ......................... 361/119
4,821,150 4/1989 Duthie et al. .............. 379/327
5,004,433 4/1991 Daoud ....................... 439/502

Primary Examiner—Neil Abrams
Attorney, Agent, or Firm—Lester H. Birnbaum

[57] ABSTRACT

Disclosed is a network interface unit which includes customer bridges and an array of circuits such as maintenance termination units (MTUs). The MTUs are provided on printed circuit boards, each including a male and female connector. Each board is inserted in between posts in the unit housing so that the female connectors plug into a mother board at the bottom. Jack wires are plugged into the male connectors and extend to the customer bridge portion of the unit.

5 Claims, 3 Drawing Sheets

NETWORK INTERFACE UNIT

BACKGROUND OF THE INVENTION

This invention relates to telecommunications network interfaces.

One of the requirements imposed on telephone companies in recent years is that some division be made between the network owned by the telephone company and the equipment owned by the individual customers. Since the customer usually owns the wires and equipment on his or her side of this network demarcation, it is important to be able to determine whether a problem in telephone service exists in the telephone company network or in the customer's wires or equipment.

In the case of buildings with several units, such as office buildings or apartments, this need is satisfied by a network interface unit which includes an array of bridges, or terminal pairs, coupled to each customer's equipment in the building. Each terminal pair is coupled to the network through a standard RJ11 jack plug so that a customer can disconnect his premises equipment and plug a working phone directly into the network for testing purposes. If service continues to be impaired, the customer knows the problem is in the network. (For an example of a network interface interconnection device, see U.S. Pat. No. 5,004,433 issued to Daoud.)

A maintenance termination unit (MTU) also allows the phone company to determine where a service problem lies. The MTU permits the central office to electronically disconnect the customer equipment by transmitting a particular voltage signal and then determine if any communications problems are in the network or the customer equipment (see, e.g., U.S. Pat. No. 4,529,847 issued to DeBalko).

It is economically desirable to provide MTUs in the same network interface unit which includes the customer bridges and RJ11 jack plugs. Typically each MTU is formed on a printed circuit board with four wires extending therefrom which must be spliced onto the wires of the network side of the interface unit. Finding the right pair of wires, and then cutting and splicing the wires for each MTU are time-consuming and awkward when the MTUs are originally installed or have to be replaced.

It is, therefore, an object of the invention to provide a network interface unit which includes MTUs and permits ease of connection of each MTU to a corresponding customer.

SUMMARY OF THE INVENTION

This and other objects are achieved in accordance with the invention which is an apparatus for connection to a telecommunications network comprising a housing and a printed circuit mother board mounted within the housing. The mother board is adapted for connection to the telecommunications network. An array of printed circuit boards is mounted essentially perpendicular to the mother board. Each such circuit board includes a pair of electrical connectors. One of the connectors is electrically coupled to the mother board.

BRIEF DESCRIPTION OF THE DRAWING

These and other features of the invention are delineated in detail in the following description. In the drawing.

It will be appreciated that, for purposes of illustration, these figures are not necessarily drawn to scale.

DETAILED DESCRIPTION

Figure 1:
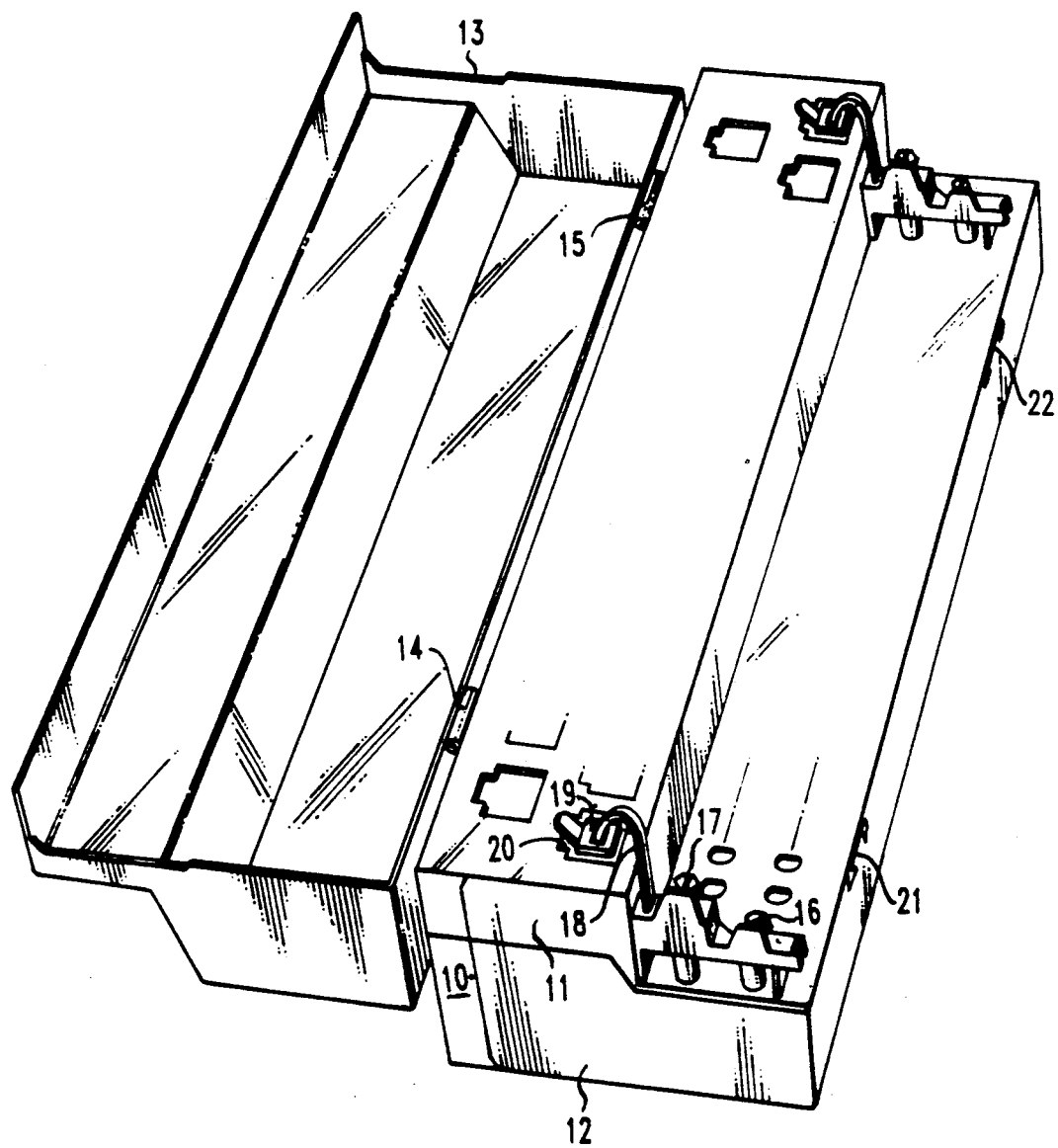
FIG. 1 is a perspective view of a portion of an apparatus in accordance with an embodiment of the invention.

FIG. 1 illustrates a portion of the apparatus according to the invention. The unit includes a housing, 10, with a top portion 11 and a bottom portion 12. A cover, 13, is attached to the top portion by means of hinges 14 and 15. Mounted above the bottom portion of the housing are two rows of terminals, e.g., 16 and 17. Each pair of adjacent terminals (e.g., 16 and 17) in the two rows constitutes a customer bridge which can be coupled to customer equipment by means of standard wire pairs (not shown). Each terminal pair is typically formed in a plastic sleeve which press fits into holes formed on the top portion, 11, of the housing 10.

Pairs of wires are coupled to each terminal pair and protected by a jacket (e.g., 18). The wires terminate in a standard RJ11 jack plug (e.g., 19) which is removably inserted into a jack (e.g., 20) in the surface of the top portion (11) of housing 10 which is adjacent to the terminal pair. As described in more detail below, each jack is electrically coupled to the telecommunications network. Thus, each customer bridge may be decoupled from the network by removing its associated plug from the jack.

Figure 2:
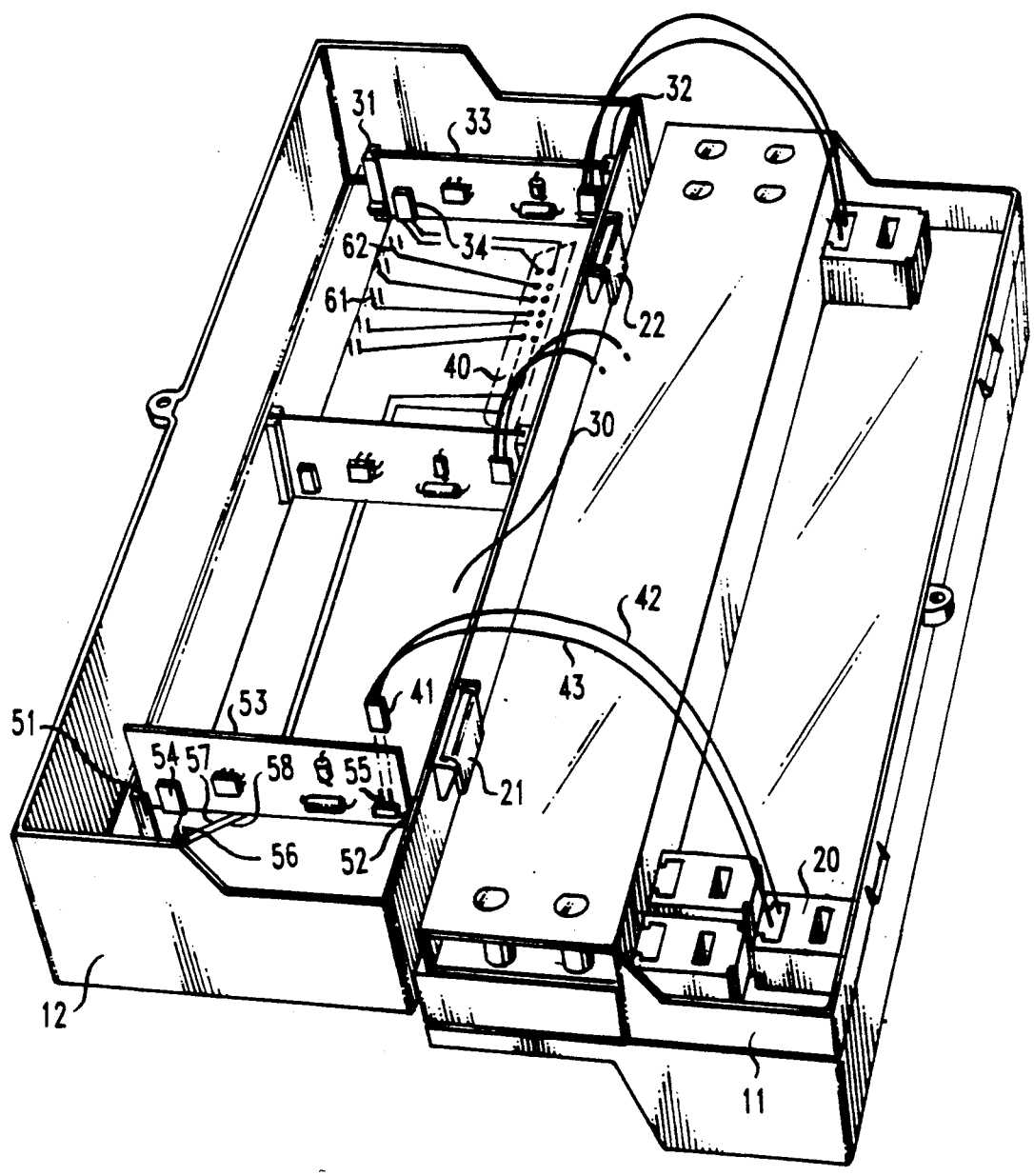
FIG. 2 is an exploded perspective view, partly cut away, of another portion of the apparatus.

FIG. 2 illustrates a portion of the apparatus of FIG. 1 with the top portion (11) of the housing, along with the customer bridges and jack plugs, opened up to reveal the contents of the bottom portion 12 of the housing. The top portion (11) is mounted to the bottom portion by means of hinges 21 and 22 so that the top portion can be swung open in a manner similar to cover 13 but in an opposite direction. At the floor of portion 12 is mounted a printed circuit mother board 30 which extends essentially the full length of the portion 12. The mother board is typically mounted by screwing the board into the floor.

Also extending from the floor of portion 12 are two rows of posts, e.g., 31 and 32, adjacent to opposite sides of the mother board. Each row of posts can be molded plastic pieces which are integral with the floor and possibly with one or more side walls of bottom portion 12. Each post includes a slot facing the mother board in order to secure a printed circuit board, e.g., 33, between two corresponding posts (e.g., 31 and 32) on opposite edges of the mother board. That is, the circuit boards are mounted in a vertical direction essentially perpendicular to the length dimension of the mother board. (It will be appreciated that, for the purpose of clarity in the illustration, only two circuit boards, 33 and 53, are shown along with their associated posts (31, 32 and 51, 52).)

As also illustrated in FIG. 2, each circuit board (e.g., 33 and 53) includes the components of a standard MTU on one surface. Near one edge of the circuit board is a female or socket-type connector (34, 54) which is electrically coupled to the input of the MTU. Near the opposite edge of the circuit board is a male or bayonet-type connector, (only 55 of board 53 being visible), which is electrically coupled to the output of the MTU. While the male and female connectors are shown near opposite edges of the board, it will be appreciated that their positions can vary.

Figure 3:
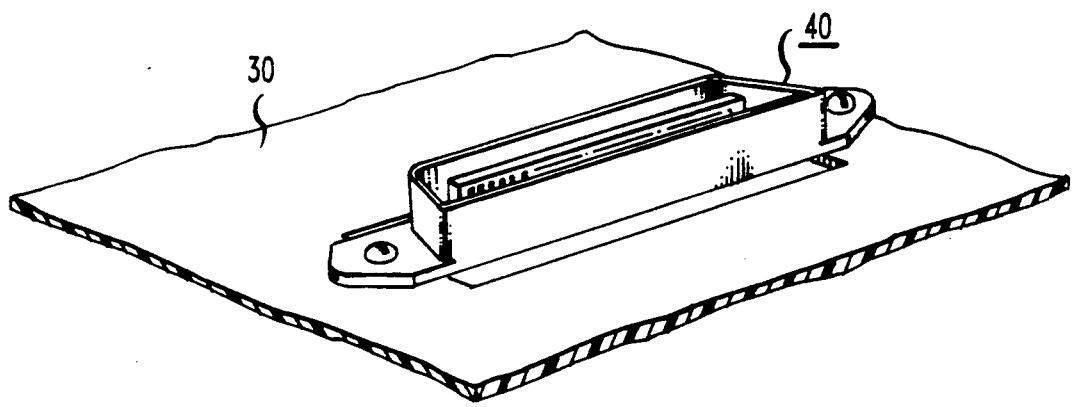
FIG. 3 is a view of a still further portion of the apparatus.

When the circuit board is inserted into the slots of its corresponding posts, the female connector (e.g., 54) will electrically engage a male connector (e.g., 56) mounted to the mother board between the posts. This male connector (56) is electrically coupled to a pair of conductors (57, 58) on the mother board extending to corresponding holes (not shown) in the mother board. These holes are electrically coupled to a standard ribbon connector, 40, (also known as an RJ21 connector) on the opposite side of the mother board 30 as illustrated in the view of FIG. 3. This connector (40) is also coupled to holes connected in a similar manner to male connectors between other posts in the housing 12 which are identical to male connector 56 of FIG. 2 (e.g., 61 and 62).

It will be appreciated that the connector, 40, of FIG. 3 is capable of receiving a standard connector including wires coupled to the telecommunications network. Thus, when the network interface unit is installed, each MTU will be coupled to the network when the circuit board (e.g., 33, 53) to which it is mounted is inserted into the slots of its corresponding posts (e.g., 31, 32 and 51, 52) and the female connector (e.g., 34, 54) on the board makes electrical contact with its associated male connector (e.g., 56) on the mother board.

Either before or after each circuit board (e.g., 53) is inserted into the slots, the male connector (e.g., 55) on the board is electrically coupled to a standard socket or female-type connector (e.g., 41). Each such female connector includes a pair of wires (e.g., 42 and 43) which terminate within a jack (e.g., 20) associated with a particular customer bridge (e.g., 16 and 17 of FIG. 1). Thus, when the plugs (e.g., 19) coupled to the customer bridges are inserted into their appropriate jacks, each customer will be coupled to the network through an individual MTU mounted on a circuit board installed in the housing.

Several advantages should be apparent with this new design. First, each board is mounted between posts associated with a particular customer bridge so that it is easy to locate which MTU belongs to which customer. The use of a mother board (30) and connectors (e.g., 56) mounted thereon considerably reduces the amount of wiring needed within the unit and eliminates the "rat's nest" of wires which might otherwise be present. Splicing of wires is also eliminated by the use of connectors.

A further advantage exists when it is desired to test or repair a particular MTU. If it becomes necessary to remove an MTU board (e.g., 53), the female connector (e.g., 41) coupled to the associated customer bridge can be electrically coupled to the male connector (e.g., 56) on the mother board. The customer would then be directly connected to the network and no service interruption would be experienced while the MTU board is absent from the interface unit.

It will be appreciated that while the embodiment described here utilizes on the MTU board (53) a female connector (54) coupled to the mother board and a male connector (55) coupled to the customer bridge jack, the opposite-type connectors could be used with an appropriate reversal of the type of connector (56) on the mother board and the connector (41) coupled to the customer bridge jack. However, it would be desirable to include both a male and female connector on the MTU board so that the associated connectors on the mother board and jack plug can be mated when the board is removed. The circuit boards may include circuits other than MTUs, such as half ringer circuits and radio interference filters.

Various additional modifications will become apparent to those skilled in the art. All such variations which basically rely on the teachings through which the invention has advanced the art are properly considered within the scope of the invention.

We claim:

1. Apparatus for connection to a telecommunications network comprising:
   a housing;
   a printed circuit mother board mounted within the housing and adapted for connection to the telecommunications network;
   an array of printed circuit boards mounted essentially perpendicular to said mother board, each circuit board including first and second electrical connectors;
   a third electrical connector coupled to the second connector on the board, said third connector including a wire pair extending therefrom and coupled to one of an array of jacks mounted in the housing; and
   a fourth connector on the mother board to which the first connector is coupled, the third and fourth connectors being capable of electrically coupling together when the circuit board is removed from the housing.

2. Apparatus according to claim 1 wherein each printed circuit board includes a maintenance termination unit.

3. Apparatus according to claim 1 wherein one of said first and second connectors is a male connector and the other of said first and second connectors is a female connector.

4. Apparatus according to claim 1 wherein the mother board is mounted horizontally on the floor of the housing, and each circuit board is positioned in slots in a pair of posts extending vertically from opposite edges of the mother board.

5. Apparatus according to claim 4 wherein the mother board includes a fifth connector mounted on a surface thereof opposite to the printed circuit boards, said fifth connector being capable of electrical connection to the telecommunications network.

* * * * *